(12) United States Patent
Buchler et al.

(10) Patent No.: US 7,133,776 B2
(45) Date of Patent: Nov. 7, 2006

(54) ATTITUDE ALIGNMENT OF A SLAVE INERTIAL MEASUREMENT SYSTEM

(75) Inventors: Robert J. Buchler, Calabasas, CA (US); Peter Kyriacou, Sun Valley, CA (US); Daniel A. Tazartes, West Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 878 days.

(21) Appl. No.: 10/333,698

(22) PCT Filed: Jul. 27, 2001

(86) PCT No.: PCT/US01/23659
§ 371 (c)(1),
(2), (4) Date: Jan. 22, 2003

(87) PCT Pub. No.: WO02/35183

PCT Pub. Date: May 2, 2002

(65) Prior Publication Data

US 2004/0030464 A1 Feb. 12, 2004

Related U.S. Application Data

(60) Provisional application No. 60/221,315, filed on Jul. 28, 2000.

(51) Int. Cl.
*G01C 21/00* (2006.01)
(52) U.S. Cl. .................... 701/220; 701/221; 244/3.1
(58) Field of Classification Search ............ 701/4, 701/200, 207, 220, 221; 244/3.1, 3.2, 3.21; 73/178 R
See application file for complete search history.

(56) References Cited

U.S. PATENT DOCUMENTS

| | | | | |
|---|---|---|---|---|
| 3,056,290 A | * | 10/1962 | Kishel | 73/178 R |
| 3,803,387 A | * | 4/1974 | Lackowski | 235/407 |
| 5,672,872 A | * | 9/1997 | Wu et al. | 250/330 |
| 5,948,045 A | * | 9/1999 | Reiner | 701/220 |
| 6,556,895 B1 | * | 4/2003 | Ben-Jaacov et al. | 701/3 |
| 2006/0015248 A1 | * | 1/2006 | Huddle et al. | 701/207 |
| 2006/0047427 A1 | * | 3/2006 | Weed et al. | 701/220 |

FOREIGN PATENT DOCUMENTS

| | | |
|---|---|---|
| JP | 02-128696 | 1/1992 |
| JP | 10-086498 | 10/1999 |

* cited by examiner

*Primary Examiner*—Gary Chin
(74) *Attorney, Agent, or Firm*—Lynn & Lynn

(57) ABSTRACT

A method for attitude alignment of a slave inertial measurement system connected to a rotationally mobile platform supported by a vehicle that is stationary relative to a reference navigation frame comprises the steps of mounting a master reference inertial measurement system on the rotationally mobile platform and determining a master reference system attitude using measurements of acceleration and angular rates of the master reference inertial measurement system relative to the reference navigation frame. A slave system attitude is determined using measurements of acceleration and angular rates of the slave inertial measurement system relative to a slave system navigation reference frame and comparing the slave system attitude to the master reference system attitude to determine an attitude difference. The attitude difference is processed to obtain a correction to the slave system attitude.

15 Claims, 5 Drawing Sheets

ATTITUDE ALIGNMENT OF A SLAVE INERTIAL MEASUREMENT SYSTEM

CROSS REFERENCE TO RELATED APPLICATION

Applicants claim the benefit of U.S. Provisional Application Ser. No. 60/221,315, filed Jul. 28, 2000 for Transfer Alignment Using Attitude Matching And Velocity Observations On A Rotationally Mobile Platform.

Statement of Government Rights in Invention: The United States Government has rights in this invention under U.S. Army contract No. DAAH01-98-C0003.

BACKGROUND OF THE INVENTION

This invention relates generally to navigation equipment and techniques. This invention relates particularly to apparatus and methods for correcting attitude errors of a vehicle supported on a rotationally mobile platform such as a rocket that is to be launched from a pod that is mounted to a vehicle.

SUMMARY OF THE INVENTION

This invention is directed to a transfer alignment system that uses attitude matching transfer align and velocity observations on a rotationally mobile platform.

The method of the invention for attitude alignment of a slave inertial measurement system that is connected to a rotationally mobile platform that is supported by a vehicle that is stationary relative to a reference navigation frame, comprises the steps of mounting a master reference inertial measurement system on the rotationally mobile platform and determining a master reference system attitude using measurements of acceleration and angular rates of the master reference inertial measurement system relative to the reference navigation frame. The method further comprises the steps of determining a slave system attitude by using measurements of acceleration and angular rates of the slave inertial measurement system relative to a slave system navigation reference frame and comparing the slave system attitude to the master reference system attitude to determine an attitude difference. The attitude difference is processed to obtain a correction to the slave system attitude.

The invention may include the sequence of events for boresight calculation and requirements for the compensation mechanization, including initialization, transfer align quaternion message processing, quaternion averaging and zero velocity updates.

The invention may include the step of filtering the attitude difference to provide an observation for a Kalman filter, which transfer aligns the slave system. Differencing of attitude is preferably accomplished via a quaternion mechanization that permits large angles to be accommodated. Filtering is preferably performed by conversion to a vector angle that is more appropriate to filtering than would be a quaternion, a direction cosine matrix, or a set of Euler angles.

The boresight compensation may be conducted using reference inertial measurement unit (IMU) measurements compared to slave IMU sensor outputs and initial approximated boresight angles. Master reference body to reference navigation (NAV) frame quaternions are rotated by stored boresight quaternions and compared with slave body to navigation frame quaternions. Each of the samples is compared, and an average difference is calculated. The rotation vector corresponding to the quaternion "difference" for each sample is computed between corresponding master reference quaternion and slave quaternion measurements. The three components of the vector difference are then averaged. The average rotation vector so obtained is processed into the Kalman filter. The algorithm provides correct timing alignment of the different quaternion samples and the mechanization for calculating small angle rotation angles using quaternion measurements.

The invention also may include a method of performing "zero velocity updates" on the slave system. A pseudo null velocity is created which can be used to improve the navigation axis alignment of the slave unit. This method is implemented without recourse to angular rates and accelerations and, instead, uses a change in attitude to compensate for rotation-induced position change.

A velocity error is calculated using the measured velocity of the slave IMU and the known change in position of the slave IMU in the NAV frame. This mechanization is a comparison of position change in the navigation frame of the slave system body. The calculated change in position is subtracted from the integrated navigation velocity over same known time interval. The result is the observation for the Kalman Filter states for velocity error.

DETAILED DESCRIPTION OF THE INVENTION

Figure 1:
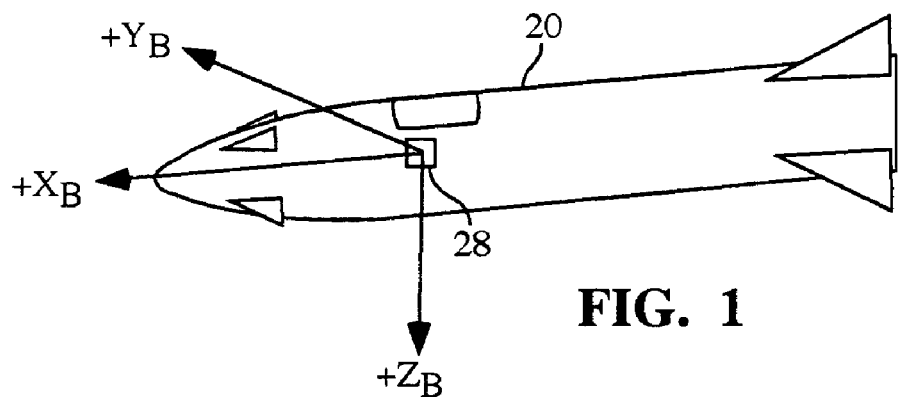
FIG. 1 illustrates Cartesian coordinates of a master IMU reference body.
Figure 2:
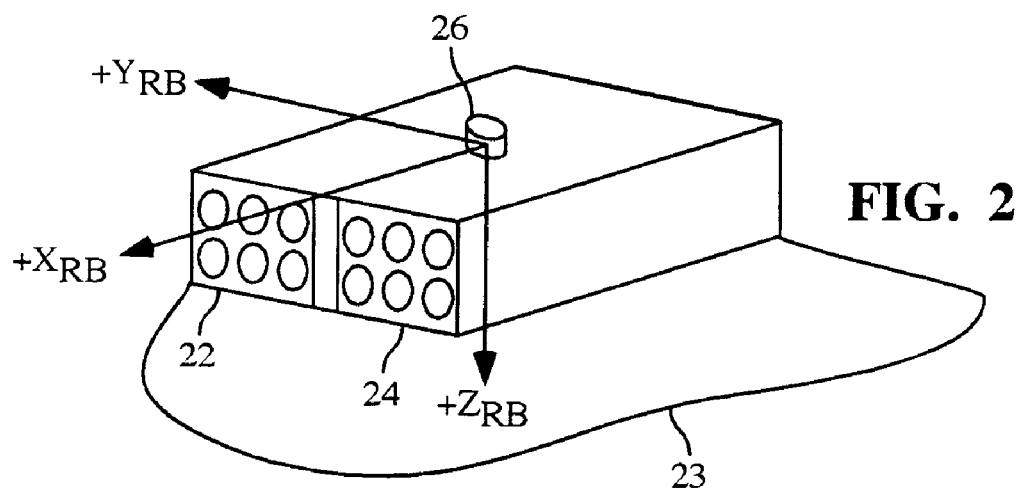
FIG. 2 illustrates Cartesian coordinates of a slave system body.
Figure 8:
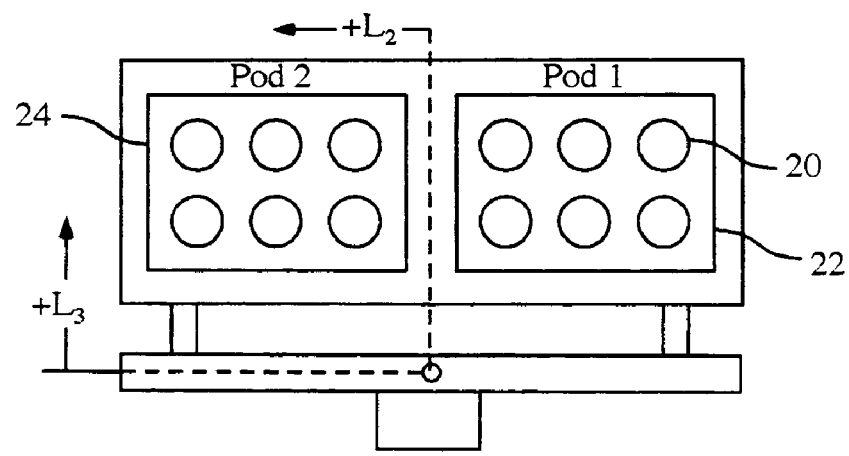
FIG. 8 illustrates numbering of rockets in a pair of rocket pods for the present invention.

This invention is directed to a transfer alignment mechanization using attitude matching, transfer align and velocity observations on a rotationally mobile platform 20, such as a rocket, as shown in FIG. 1 mounted in a launching pod 22 or 24 as shown in FIG. 2. Referring to FIGS. 2 and 8, before launch, the rocket 20 ordinarily is contained in a pod 22 that is mounted on a land-based vehicle 23 such as a truck or a tank. FIGS. 2 and 8 show a second pod 24 with each of the pods 22 and 24 containing a plurality of rockets 20. The pods 22 and 24 are normally kept in a travel lock (TL) position except during the launch sequence. Controlling the rocket 20 involves aligning the rocket to a stable navigation reference frame. This is accomplished using a master inertial measurement unit (IMU) 26 fixed to the vehicle 23 to serve as a reference body and the axes of a slave IMU 28 fixed to the rocket 20 to serve as a slave system body. However, an additional unknown is the relative alignment of the master IMU 26 axes and the slave IMU 28 axes. This relative alignment is known as the boresight. Because the rocket 20 is expendable, the slave sensor 28 typically is less accurate than the reference sensor 26, which sometimes results in errors in alignment This invention corrects the boresight error and aligns the slave IMU 28 to a reference navigation frame before the rocket 20 is launched.

Some of the calculations necessary for compensating for boresight errors are performed more conveniently using quaternions instead of the more conventional vectors. Quaternions are conveniently used in calculations that involve transformations between coordinate systems that rotate relative to one another. A brief explanation of the basic properties of quaternions is presented to facilitate understanding the present invention. Quaternions are the result of a generalization of the complex number system. In the complex number system there are three anti-commuting hypercomplex roots of $-1$, which in quaternion notation are represented by the letters i, j, k, where. The numbers i, j, k, have the following properties:

$$i*j = -j*i = k \qquad (1)$$

$$j*k = -k*j = i \qquad (2)$$

$$k*i = -i*k = j \qquad (3)$$

A quaternion may be written as linear combination of a number w and the product of coefficients x, y, z and i, j, k, which may be written as:

$$q = w + xi + yj + zk. \qquad (4)$$

The conjugate of a quaternion q is written as:

$$q^* = w - xi - yj - zk. \qquad (5)$$

A quaternion q has a magnitude that is written as $$\|q\| = \sqrt{qq^*} = \sqrt{w^2 + x^2 y^2 + z^2}. \qquad (6)$$

A unit quaternion has a magnitude of 1, therefore for a unit quaternion $q^{-1} = q^*$ where $q^{-1}$ is the multiplicative inverse, which can be computed by $$q^{-1} = \frac{q^*}{qq^*}. \qquad (7)$$

Quaternions are associative such that $$(q_1 * q_2) * q_3 = q_1 * (q_2 * q_3). \qquad (8)$$

However, quaternions are not commutative such that $$q_1 * q_2 \neq q_2 * q_1. \qquad (9)$$

In addition to the expression of Eq. (4) a quaternion q may be written a row vector, a column vector or as a combination of a vector and a scalar:

$$q = [x \ y \ z \ w] = \begin{vmatrix} x \\ y \\ z \\ w \end{vmatrix} = (s, v), \qquad (10)$$

where s=w and v=[x y z]. The product of two quaternions $q_1 = (s_1, v_1)$ and $q_2 = (s_2, v_2)$ can be written using the multiplicative properties of i, j, k, and standard vector products in the following way:

$$q_1 q_2 = (s_1 s_2 - v_1 \cdot v_2, \ S_1 v_2 + s_2 v_1 + v_1 \times v_2). \qquad (11)$$

The quaternion that represents rotation, or orthogonal transformation, about a unit vector u by an angle θ may be written as:

$$q = (s, v) = \left(\cos\frac{\theta}{2}, u\sin\frac{\theta}{2}\right). \qquad (12)$$

A point p in space may be represented by the quaternion P=(0, p). Rotation of the point p about a unit vector u is computed as follows:

$$P_{rotated} = qPq^{-1}. \qquad (13)$$

Some calculations associated with the present invention involve two rotations. If $q_1$ and $q_2$ are quaternions representing two rotations, a composite rotation that comprises the first rotation followed by the second rotation is represented by the quaternion $q_2 q_1$. Using Eq. (13) the result of applying the composite rotation to the point P is written as:

$$q_2 (q_1 P q_1^{-1}) q_2^{-1} = (q_2 q_1) P (q_1^{-1} q_2^{-1})^{-1} = (q_2 q_1) P (q_1 q_2)^{-1}. \qquad (14)$$

The product of two quaternions $$q_1 = w_1 + x_1 i + y_1 j + z_1 k. \qquad (15)$$

$$q_2 = w_2 + x_2 i + y_2 j + z_2 k \qquad (16)$$

can be written as $$q_1 q_2 = w_1 w_2 - x_1 x_2 - y_1 y_2 - z_1 z_2 + \qquad (17)$$
$$(w_1 x_2 + x_1 w_2 + y_1 z_2 - z_1 y_2) i +$$
$$(w_1 y_2 - x_1 z_2 + y_1 w_2 + z_1 x_2) j +$$
$$(w_1 z_2 + x_1 y_2 - y_1 x_2 + z_1 w_2) k$$

Rotations may also be computed using matrices. However, a matrix product requires many more mathematical operations than a quaternion product. Therefore using quaternions saves time while preserving numerical accuracy in such calculations.

This invention includes a sequence of events for the boresight calculation and the compensation mechanization, which include initialization, transfer align quaternion message processing, quaternion averaging, and zero velocity updates.

Figure 3:
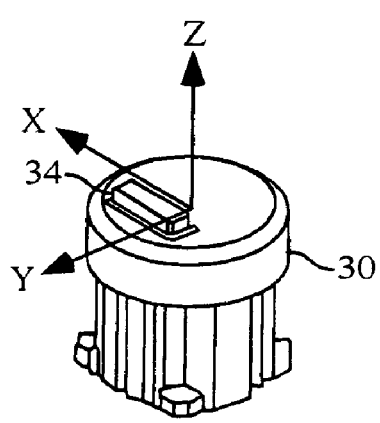
FIG. 3 illustrates Cartesian coordinates of a slave IMU orthogonal frame.
Figure 4:
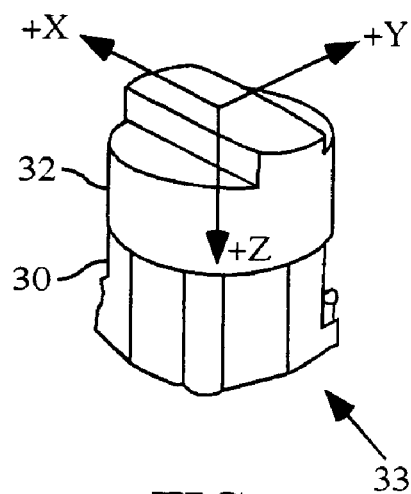
FIG. 4 illustrates Cartesian coordinates of an inertial navigation unit (INU) reference frame.

FIG. 3 shows an inertial measurement unit (IMU) 30, which includes a three-axis rotation sensor (not shown) and accelerometers (not shown) for providing angular orientation and acceleration for the rocket 20. The IMU 30 may be formed in accordance with well-known rotation sensor and accelerometer technology. FIG. 4 shows the IMU 30 coupled to a global positioning system (GPS) module 32 to form an inertial navigation unit (INU) 33 that provides data on the angular orientation, acceleration, velocity and position of the rocket 20. GPS modules suitable for practicing the invention are well known in the art. The IMU 30 includes an elongated connector 34 that may be used for coupling the GPS module 32 to the IMU 30.

Figure 5:
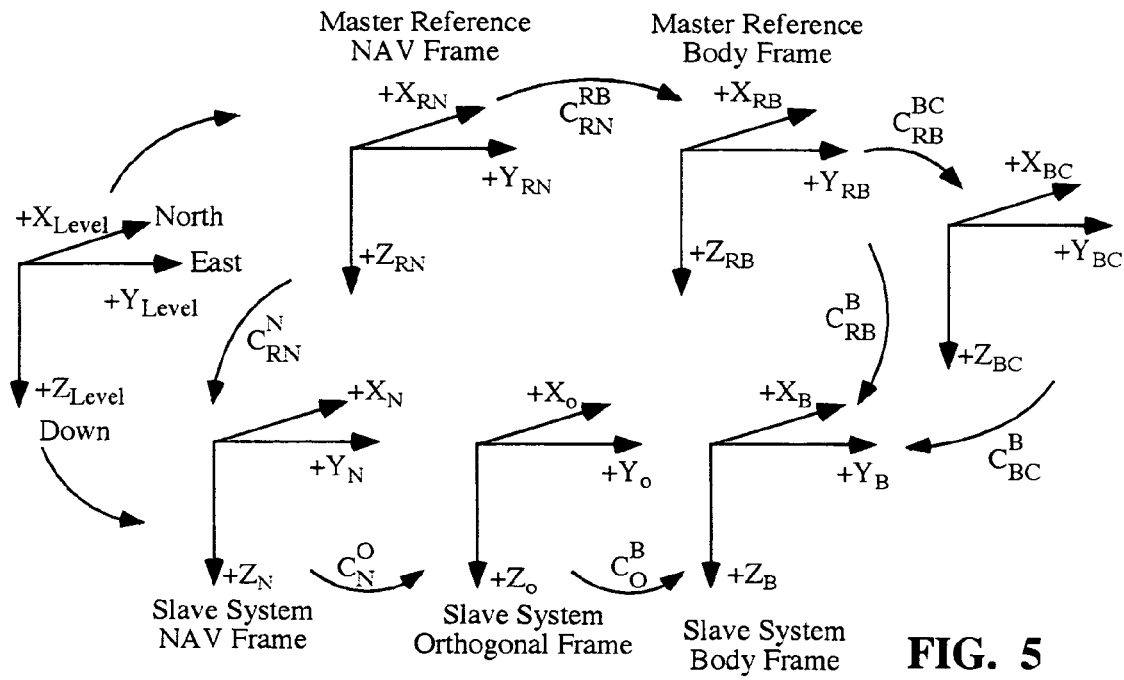
FIG. 5 illustrates the relationships of the slave system body frame, the slave system orthogonal frame and the slave system navigation reference frame to the master reference body and master reference navigation frames and further shows the slave system body to master reference body boresight.

As shown in FIG. 5, a system navigation (NAV) frame is defined as $X_N$ and $Y_N$ in the local level with wander angle azimuth $\alpha=0°$ ($+X_N$ pointing north) and $+Z_N$ pointing down. There are five reference frames associated with boresight correction: (1) a master IMU reference body frame, (2) a reference navigation (NAV) frame, (3) a slave system body frame, (4) a slave system NAV frame and (5) a slave system orthogonal frame. The master IMU reference body axes ($X_{RB}$, $Y_{RB}$, $Z_{RB}$) are shown in FIG. 2, with $+X_{RB}$ pointing forward, $+Z_{RB}$ pointing down, and $+Y_{RB}$ perpendicular to $X_{RB}$ and $Z_{RB}$ forming a right-handed reference frame. The slave system body frame axes ($X_B$, $Y_B$, $Z_B$) are shown in FIG. 1, and are $+X_B$ out of the nose of the rocket 20, $+Y_B$ out the starboard side, and $+Z_B$ out the belly. The slave system reference frame axes (X, Y, Z) are shown in FIG. 3 with $+X$ being along the connector 34, $+Y$ being perpendicular to the connector 34 and $+Z$ being upwards.

FIG. 4 shows the slave system orthogonal frame. This frame is mathematically related to the slave system body frame using a predetermined relationship. FIG. 5 shows the relationship of the slave system body, slave system orthogonal, and slave system NAV frames to the master reference body and master reference NAV frames. This diagram also shows the slave system body to reference body boresight. In FIG. 5 the following definitions apply:

$$C_{RN}^{RB}$$

is the direction cosine matrix indicating rotation from the master reference NAV frame to the master reference body frame and is available as the quaternion $$Q_{RN}^{RB}.$$

$C_N^O$ is the direction cosine matrix indicating rotation from the slave system NAV frame to the slave system orthogonal frame and is available as the quaternion $Q_N^O$.

$C_O^B$ is the direction cosine matrix indicating rotation from the slave system orthogonal frame to the slave system body frame (predetermined relationship) and is available as the quaternion $Q_O^B$.

$$C_{RB}^B$$

is the direction cosine matrix indicating rotation from the master reference body frame to the slave system body frame (boresight)—(unknown). (Also denoted by the quaternion representation $$q_{L \to B} \text{ or } Q_{RB}^B).$$

$$C_{RN}^N$$

is the direction cosine matrix indicating rotation from the reference NAV frame to the slave system NAV frame.

If the reference NAV frame tilts are zero and $$\alpha = \alpha_R = 0, \text{ then } C_{RN}^N$$

corresponds to the rotation due to system NAV tilts $\phi_x$ and $\phi_y$ and the azimuth rotation $\phi_z$.

Figure 9:
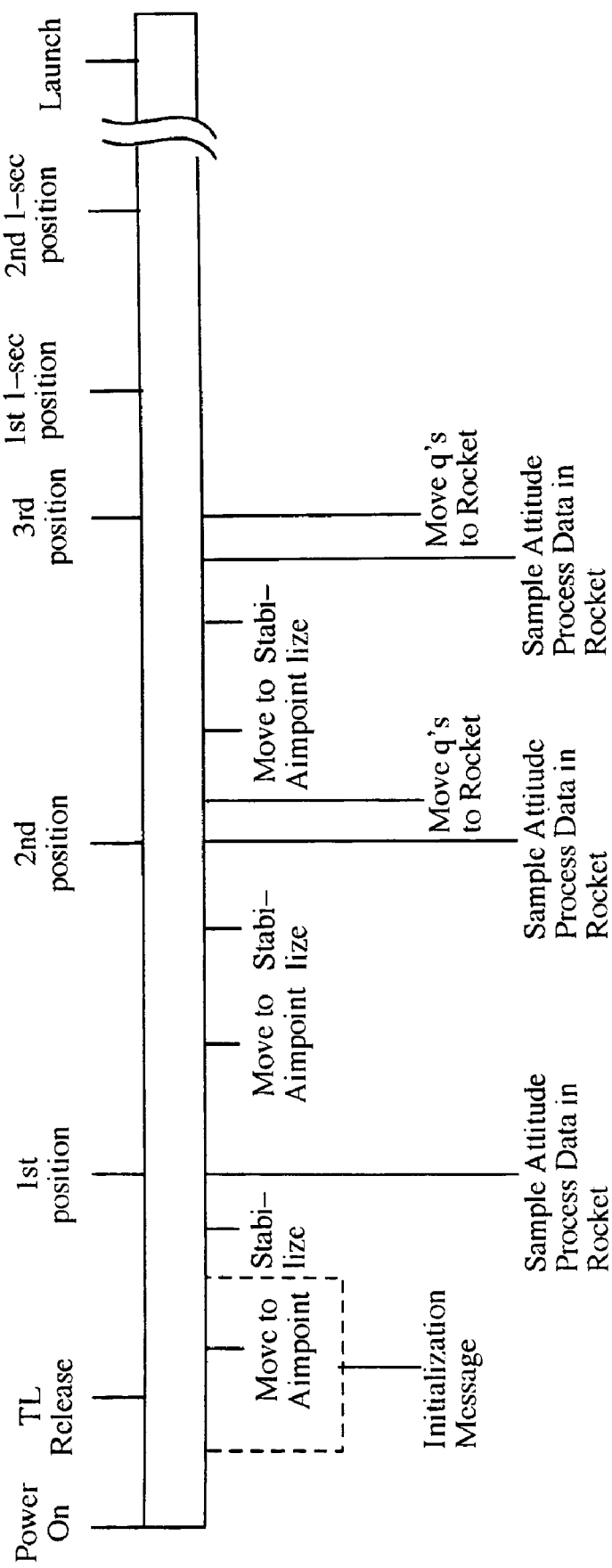
FIG. 9 is an events time line for the present invention.

There are five major events in the prelaunch sequence, which occur before the rocket 20 will be launched. These are described below and are shown in the events time line of FIG. 9, which is not drawn to scale. The first event is Power On (PO), which initializes execution of the sequence.

Figure 6:
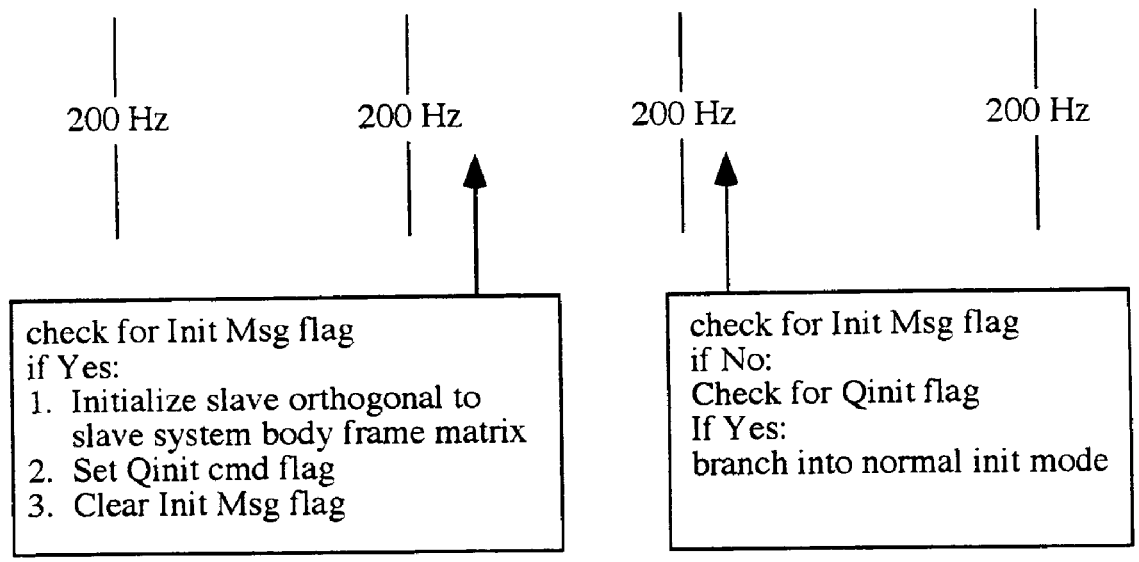
FIG. 6 shows the timing sequence for initializing axis transformations used in implementing the present invention.
Figure 10:
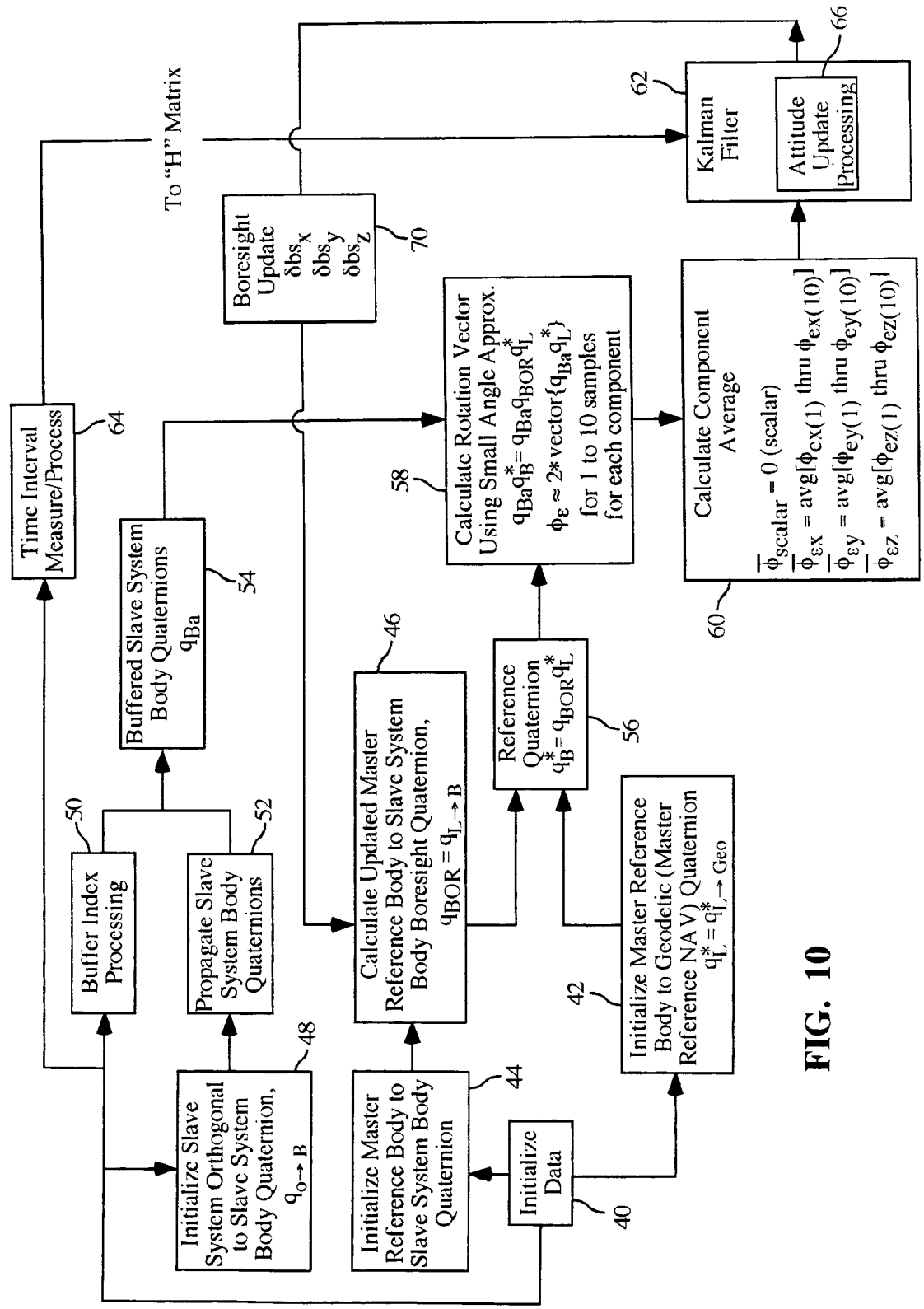
FIG. 10 is a software diagram for the present invention.

The second event is a launcher initialization message that includes an Initialize Data Command 40 shown in the flow diagram of FIG. 10. The Initialize Data Command 40 initializes a master reference body frame to Master reference NAV frame quaternion 42 and initializes a master reference body to slave system body frame quaternion 44, which represent a priori knowledge of the latitude, longitude, height, ground align command, orientation and boresight of a selected bore in the rocket pod 20. The Intialize Data Command 40 also initializes the slave system orthogonal frame to the NAV frame quaternion 46 and initializes the slave orthogonal frame to the slave system body frame quaternion 48 quaternion $q_{o \to B}$. Travel lock (TL) release will occur after Power On and before movement to the first position. The initialization message can occur at any time during this period. The timing sequence for the initialization processes is shown in FIG. 6.

The third event is setting the first alignment position, which is the position of the selected rocket pod 22 after travel locks have been released and the pod 22 is stabilized.

The fourth event is when the rocket pod 22 moves to its second alignment position after indication of receipt of position 1 information from the master reference system.

The fifth event occurs when the rocket pod 22 moves to position 3 after receipt of position 2 information from the master reference system. Position 3 is typically a launch angle that is 20° to 60° elevation above local level and 90° to 180° azimuth from the initial position. After the receipt of this last matching message from the master system, the rocket 20 is ready for launch.

At each of the first three initialization positions, the rocket 20 preferably receives 2 seconds of 10 Hz data, which corresponds to 20 quaternion samples. Updates will continue at the launch position until all the rockets have been fired or until the rocket pod 22 is re-stowed and the power is turned off. The master INS preferably provides a quaternion message of 1 second of 10 Hz data every 30 seconds for periodic updates. If power is cycled, the rockets will be reinitialized.

Slave system orthogonal to slave system body initialization 48 is controlled by the algorithm, which polls for an initialization message flag at 200 Hz. Quaternion initialization utilizes the master reference (launcher) frame to the master reference geodetic frame quaternion ($q_{L \to Geo}$) 42 and the master reference frame to slave system frame quaternion ($q_{L \to B}$) 44 data received from the initialize data command 40. The master reference body initialization quaternion ($q_{L \to Geo}$) 42, initial master reference body to slave system quaternion ($q_{B \to L}$) 44 and slave system orthogonal to slave system body quaternion ($q_{O \to B}$) 48 initialize the slave system orthogonal frame to the slave system NAV frame quaternion ($q_{O \to N}$) 52 as shown below. For initialization and transfer align, $\alpha_{ref}=0$, thus initially the slave system orthogonal frame to the slave system NAV frame quaternion ($q_{O \to N}$) equals the slave system orthogonal frame to geodetic frame quaternion.

The following equation applies:

$$q_{0 \to N} = q_{0 \to Geo} = q_{L \to Geo} q^*_{L \to B} q_{0 \to B} \quad (18)$$

where $q_{0 \to Geo}$=slave system orthogonal frame to geodetic frame quaternion (NAV frame when $\alpha=0$);

$q_{L \to Geo}$=master reference body frame to geodetic frame quaternion;

$q_{L \to B}$=master reference body frame to slave system body frame quaternion (boresight);

$q_{0 \to B}$=slave system orthogonal frame to slave system body frame quaternion; and q* is the inverse quaternion, which is achieved by negating the vector part of a rotation quaternion.

An arbitrary vector V expressed in the slave system frame is transformed to the system NAV frame by:

$$\underline{V}^{(N)} = q_{B \to N} \underline{V}^{(B)} q^*_{B \to N}. \quad (19)$$

This concludes the initialization processes.

Quaternion message processing includes periodically updating the quaternions. The quaternion updates are performed upon receipt of the master reference body frame to geodetic frame sets of quaternions. There are either 10 or 20 sets of quaternions depending on the transfer align mode. For the twenty-sample mode, the processing algorithm is run as with 10 samples, but twice consecutively, shifting the buffer pointer and word address.

A buffering process buffers the slave system quaternions internally. This buffering preferably is at a frequency of 200 Hz. These are the slave system body frame to slave system NAV frame quaternions ($q_{Ba}$) as computed by the IMU. This data is buffered using the index calculated below:

At 200 Hz
If (++$L_{200\ Hzcnt}$ ==interval)
{$L_{200\ Hzcnt}$=0
$q_{index}$++
$q_{index}$ &=(bufflength−1)
$q_{buff}[q_{index}]=q_{Ba}$} if (update message is received)
{$q_{indexlatch}=q_{index}$
Latch$_{200\ Hzcnt}=L_{200\ Hzcnt}$
where:
bufflength=512 (size of buffer, must be a power of 2);
interval=1;
$q_{Ba}$=slave system body to slave system NAV system output quaternion; and
$L_{200\ Hzcnt}$=200 Hz counter.

The IMU software uses the index calculated above to extract the center slave body NAV quaternion from the buffered data. The direction cosines $C_N^B$ required for the measurement matrix H of the Kalman processing are determined using this sample by conversion of the center quaternion to a direction cosine matrix.

This section provides an analysis that will be referenced subsequently for quaternion processing and rotation vector averaging. The master reference system quaternions $q_{L \to Geo}$ are rotated by the stored boresight quaternions $q_{BOR}$ to provide a reference quaternion 56. This rotation is accomplished by multiplying the quaternion $q_{L \to Geo}$ by the quaternion $q_{BOR}$. The result of the rotation is compared with slave system body quaternions. All of the samples (20 or 10) are compared and an average difference is then calculated. If the quaternions themselves are directly averaged, the four averaged components may no longer represent a valid normalized quaternion. Instead, the rotation vector corresponding to the quaternion "difference" for each sample is computed between corresponding master reference quaternion and slave system quaternion measurements. The three components of the vector difference are then averaged in a Calculate Component Average process 60. The average rotation vector so obtained is processed into the Kalman filter 62.

A reference quaternion $q_B$ is defined as the master reference body frame to master reference NAV frame quaternion multiplied with the slave system body frame quaternion to the master reference body frame boresight quaternion, which may be written as $$q_B = q_L q^*_{BOR}. \quad (20)$$

For compactness the master reference body frame to geodetic frame quaternion $q_{L \to Geo}$ is written as:

$$q_L = q_{L \to Geo}; \quad (21)$$

The master reference body frame to slave system body frame quaternion $q_{L \to B}$ (boresight) is written as:

$$q_{BOR} = q_{L \to B}. \quad (22)$$

Recalling that $q_{Ba}$=slave system body frame to slave system NAV frame quaternion (approximation of $q_B$), the small angle approximation for the rotation vector is:

$$(\phi, 0)_\epsilon \approx q_{Ba} q^*_{Ba} - q_B q^*_{Ba} \quad (23)$$

$$\phi_\epsilon \approx 2 * \text{vector}\{q_{Ba} q^*_B\} \quad (24)$$

Using Eq. (20), the quaternion product $q_{Ba} q_B^*$ in Eq. (24) may be written as $$q_{Ba} q^*_B = q_{Ba} q_{BOR} q^*_L. \quad (25)$$

The following steps may be used to implement Eqs. (23), (24) and (25). Other orders of processing are possible.

Step 1: Determine the quaternion product $q_{BOR} q_L^*$ (both scalar and vector are needed). The quaternions $q_{BOR}$ and $q_L$ may be written as $$q_{BOR} = (q_{BOR1}, q_{BOR2}, q_{BOR3}, q_{BOR4}), \quad (26)$$

and $$q_L = (q_{L1}, q_{L2}, q_{L3}, q_{L4}). \quad (27)$$

In Eqs. (26) and (27) the subscripts 1, 2, 3 correspond to i, j, k and the subscript 4 refers to the scalar components of the quaternions. The master reference quaternion $q_L$ is the master reference frame to master reference NAV frame (geodetic frame) quaternion and is sent during each update (either 10 or 20). Now define a quaternion $q_F$ as follows:

$$q^*_B = q_{BOR} q^*_L = q_F = (q_{F1}, q_{F2}, q_{F3}, q_{F4}) \quad (28)$$

The components of $q_{F4}$, $q_{F1}$, $q_{F2}$ and $q_{F3}$ may now be calculated as follows using quaternion multiplication beginning with the scalar term $q_{F4}$:

$$q_{F4}=(q_{BOR4}q_{L4}+q_{BOR1}q_{L1}+q_{BOR2}q_{L2}+q_{BOR3}q_{L3})\text{(scalar)} \quad (29)$$

$$q_{F1}=(-q_{BOR4}q_{L1}+q_{BOR1}q_{L4}-q_{BOR2}q_{L3}+q_{BOR3}q_{L2}) \quad (30)$$

$$q_{F2}=(-q_{BOR4}q_{L2}+q_{BOR2}q_{L4}-q_{BOR3}q_{L1}+q_{BOR1}q_{L3}) \quad (31)$$

$$q_{F3}=(-q_{BOR4}q_{L3}+q_{BOR3}q_{L4}-q_{BOR1}q_{L2}+q_{BOR2}q_{L1}) \quad (32)$$

This multiplication is done for ten samples of $q_F$ (1 through 10) using the same characteristic boresight $q_{BOR}$ for all ten samples. The result is:

$$q_{Fj}=q_{Fj1},q_{Fj2},q_{Fj3},q_{Fj4} \text{ where } j=(1,\ldots,10). \quad (33)$$

Step 2: Using Eq. (24):

$$\phi_\epsilon = 2 * \text{vector}(q_{Ba}q_F) \quad (34)$$

$$\phi_{\epsilon x}=2(q_{Ba4}q_{F1}+q_{Ba1}q_{F4}+q_{Ba2}q_{F3}-q_{Ba3}q_{F2}) \quad (35)$$

$$\phi_{\epsilon y}=2(q_{Ba4}q_{F2}+q_{Ba2}q_{F4}+q_{Ba3}q_{F1}-q_{Ba1}q_{F3}) \quad (36)$$

$$\phi_{\epsilon z}=2(q_{Ba4}q_{F3}+q_{Ba3}q_{F4}+q_{Ba1}q_{F2}-q_{Ba2}q_{F1}). \quad (37)$$

This multiplication is done for ten time-aligned samples of $q_{Ba}$ and $q_F$.

Now the average values of $\phi_{\epsilon x}$, $\phi_{\epsilon y}$, and $\phi_{\epsilon z}$ are calculated. These averages may be written as:

$$\bar{\phi}_{\epsilon x} = \frac{1}{10}\sum_{i=1}^{10}\phi_{\epsilon xi} \quad (38)$$

$$\bar{\phi}_{\epsilon y} = \frac{1}{10}\sum_{i=1}^{10}\phi_{\epsilon yi} \quad (39)$$

$$\bar{\phi}_{\epsilon z} = \frac{1}{10}\sum_{i=1}^{10}\phi_{\epsilon zi}. \quad (40)$$

The average rotation angles for the three vector components of the boresight error are applied as observations to the Kalman filter.

$$\begin{bmatrix} \bar{\phi}_{\epsilon x} \\ \bar{\phi}_{\epsilon y} \\ \bar{\phi}_{\epsilon z} \end{bmatrix} = \begin{bmatrix} 1 & 0 & 0 & (-C_N^B)_{11} & (-C_N^B)_{12} & (-C_N^B)_{13} \\ 0 & 1 & 0 & (-C_N^B)_{21} & (-C_N^B)_{22} & (-C_N^B)_{23} \\ 0 & 0 & 1 & (-C_N^B)_{31} & (-C_N^B)_{32} & (-C_N^B)_{33} \end{bmatrix} \begin{bmatrix} \varphi_x \\ \varphi_y \\ \varphi_z \\ \delta bs_x \\ \delta bs_y \\ \delta bs_z \end{bmatrix} \quad (41)$$

The measurement noise for the X, Y and Z observations is preselected appropriately for the application in question.

The boresight observation and error states for the tilt and boresight are written as:

| Observation: | States: | |
|---|---|---|
| $\begin{bmatrix} \bar{\phi}_{\epsilon x} \\ \bar{\phi}_{\epsilon y} \\ \bar{\phi}_{\epsilon z} \end{bmatrix}$ | $\begin{bmatrix} \varphi_x \\ \varphi_y \\ \varphi_z \\ \delta bs_x \\ \delta bs_y \\ \delta bs_z \end{bmatrix}$ | $\}$ Tilt <br> $\}$ Boresight |

The initial covariances and process noise for the three boresight states are determined by the uncertainty in the mechanical alignment between the master and slave systems. The Transition Matrix portion for the three boresight states is:

$$\begin{bmatrix} 1 & 0 & 0 \\ 0 & 1 & 0 \\ 0 & 0 & 1 \end{bmatrix}$$

The three small angle rotations that are applied to the present boresight rotation and used to form the boresight update quaternion are:

$$(Q_{\delta bs})_1 = \frac{\delta bs_x}{2} \quad (42)$$

$$(Q_{\delta bs})_2 = \frac{\delta bs_y}{2} \quad (43)$$

$$(Q_{\delta bs})_{31} = \frac{\delta bs_z}{2} \quad (44)$$

$$(Q_{\delta bs})_4 = 1 - \frac{1}{2}\{[(Q_{\delta bs})_1]^2 + [(Q_{\delta bs})_2]^2[(Q_{\delta bs})_3]^2\}. \quad (45)$$

The boresight update quaternion is used to improve the current quaternion approximation. This will form the new approximation, which is:

$$(Q_{RB}^B)_{4(n+1)} = (Q_{\delta bs})_4(Q_{RB}^B)_{4(n)} - (Q_{\delta bs})_1(Q_{RB}^B)_{1(n)} - (Q_{\delta bs})_2(Q_{RB}^B)_{2(n)} - (Q_{\delta bs})_1(Q_{RB}^B)_{1(n)} \quad (46)$$

$$(Q_{RB}^B)_{3(n+1)} = (Q_{\delta bs})_4(Q_{RB}^B)_{3(n)} + (Q_{\delta bs})_3(Q_{RB}^B)_{4(n)} + (Q_{\delta bs})_1(Q_{RB}^B)_{2(n)} - (Q_{\delta bs})_2(Q_{RB}^B)_{1(n)} \quad (47)$$

$$(Q_{RB}^B)_{1(n+1)} = (Q_{\delta bs})_4(Q_{RB}^B)_{1(n)} + (Q_{\delta bs})_1(Q_{RB}^B)_{4(n)} + (Q_{\delta bs})_2(Q_{RB}^B)_{3(n)} - (Q_{\delta bs})_3(Q_{RB}^B)_{2(n)} \quad (48)$$

$$(Q_{RB}^B)_{2(n+1)} = (Q_{\delta bs})_4(Q_{RB}^B)_{2(n)} + (Q_{\delta bs})_2(Q_{RB}^B)_{4(n)} + (Q_{\delta bs})_3(Q_{RB}^B)_{1(n)} - (Q_{\delta bs})_1(Q_{RB}^B)_{3(n)} \quad (49)$$

Periodic quaternion updates continue until the rocket 20 on the pod 22 is launched. After the rocket 20 is launched, and the resulting motion of the pod 22 has been damped, the rockets remaining in the pod 22 will receive a master reference quaternion message that will include a "Rocket Fired" flag. When this flag is detected, the diagonals of the three boresight states covariances are forced to increase (Q pumped) to indicate a possible boresight shift. The three diagonals of the boresight states covariances will be incremented by $\Delta P$, such that the new covariance $P_{new}=P+\Delta P$. The off-diagonal elements will not be changed. The covariance increase must be done before the quaternion message is processed. $\Delta P$ will be determined by the anticipated boresight shift due to launch dynamics. New master reference quaternions are made available at the first update period after each launch. Quaternion observations will quickly capture the new boresight errors. This concludes the transfer align process.

In order to further enhance performance, a second aspect of the present invention performs pseudo zero velocity updates. The invention adds a new step to a standard zero velocity updating scheme. The first calculation of the zero velocity updating mechanization computes $V_t$ (velocity vector in the NAV frame), which is assumed to be zero for standard zero velocity updating processing. For use on a rotationally mobile platform such as a gimbaled launcher, it is recognized that the slave system may experience a non-zero velocity in the NAV frame even if the vehicle itself is stationary. This non-zero velocity results from rotational motion of the launcher pods 22 and 24. A correction to the slave velocity is computed to form a pseudo zero velocity. This velocity error is calculated by using the measured velocity of the slave system IMU and the known change in position of the slave system body IMU in the NAV frame using lever arms of the IMU position and pivot points.

Figure 7:
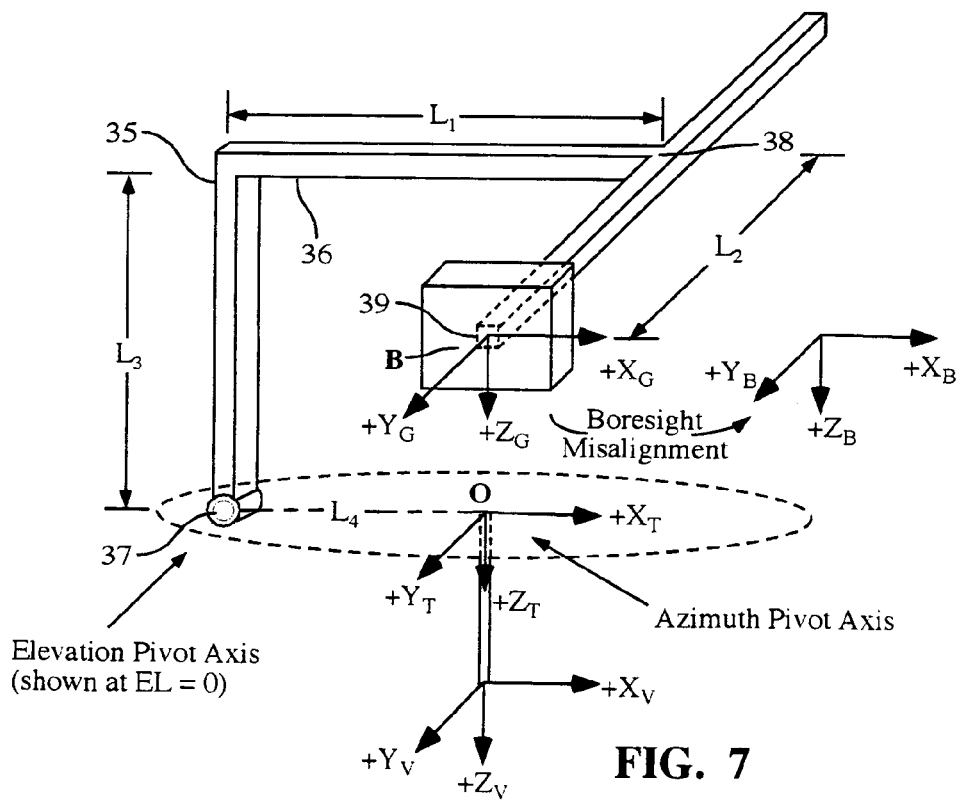
FIG. 7 illustrates a lever arm structure that conceptually illustrates the invention.

FIG. 7 illustrates IMU position (point B), Azimuth Pivot (point 0), Elevation Pivot (point P), and conceptual lever arms $L_1$, $L_2$, $L_3$, and $L_4$ that are useful in understanding the present invention.

The lever arms $L_1$ and $L_3$ have ends 35 and 36, respectively, that intersect at a right angle. The other end 37 of the lever arm $L_3$ is arranged to be pivotable about the elevation pivot axis P, shown at EL=0. The lever arm L, has an end 38 that bisects the lever arm $L_2$ at a right angle. The slave system IMU position, point B, is at an end 39 of the lever arm $L_2$. The coordinates for the IMU are shown at point B with axes $X_G$ pointing to the right, $Z_G$ pointing downward and $Y_G$ being perpendicular to $X_G$ and $Y_G$ and arranged to form a right hand coordinate system. The lever arm $L_4$ extends from the elevation pivot axis to point O, which is on the azimuth pivot axis. A coordinate system $X_T$, $Y_T$ and $Z_T$ is centered at point O. The $Z_T$ axis extends downward and defines the azimuth pivot axis. The $X_T$ points to the right, and the $Y_T$ axis points forward.

This mechanization is a comparison of position change in the navigation frame of the center of navigation of the slave system IMU over the 1-second time interval synchronized with the Kalman filter. This will be used in measurement observation. This is due to the motion of the launcher azimuth and elevation gimbals.

The following assumptions are made:

The elevation pivot axis hole, located at point P on the elevation structure, lies parallel to the $Y_G$ axis.

The elevation pin (located at point P on the turret structure) is located on the negative $X_T$ axis.

The elevation pin lies in the $X_T Y_T$ plane, pointing in the $Y_T$ direction.

The following notation is used for the direction cosine matrices:

$C_{N1}^B$ is the system direction cosine matrix, NAV frame to system body frame, at the start of the 1-second interval.

$C_{N2}^B$ is the system direction cosine matrix, NAV frame to slave system body frame, at the end of the 1-second interval.

$C_{RB}^B$ is the direction cosine matrix of rotation from the master reference body frame to the slave system body frame. This matrix represents a frame rotation due to total boresight.

The change in position is calculated by solving for the change of the conceptual lever arm between points O and B ($L_{OB}$). The equations for the calculation are:

$$D = (C_{RB}^B)^T C_{N2}^B \left[(C_{RB}^B)^T C_{N1}^B\right]^T. \tag{50}$$

The elements of $D^T$ are used to solve for the velocity effect on the lever arm $L_4$ (VEC). If $(D^T)_{22}<0.99955$ then VEC is calculated as follows:

$$EL_1 = TAN^{-1}\left[\frac{-(D^T)_{32}}{-(D^T)_{12}}\right] \tag{51}$$

$$SEL_1 = SIN(EL_1) \tag{52}$$

$$CEL_1 = \sqrt{1-(SEL_1)^2} \tag{53}$$

$$C\Delta\theta Z = (D^T)_{22} \tag{54}$$

$$S\Delta\theta Z = \frac{-(D^T)_{12}}{CEL_1} \tag{55}$$

$$VEC = \begin{bmatrix} CEL_1(C\Delta\theta Z - 1) \\ S\Delta\theta Z \\ SEL_1(C\Delta\theta Z - 1) \end{bmatrix} \tag{56}$$

If $(D^T)_{22}$ is $>0.99955$ then VEC is calculated as follows:

$$|S\Delta\theta Z| = \sqrt{[(D^T)_{12}]^2 + [(D^T)_{22}]^2} \tag{57}$$

If $(D^T)_{12}<0$ then $$S\Delta\theta Z = -|S\Delta\theta Z| \tag{58}$$

Else $$S\Delta\theta Z = |S\Delta\theta Z| \tag{59}$$

$$VEC = \begin{bmatrix} 0 \\ S\Delta\theta Z \\ 0 \end{bmatrix} \quad (60)$$

After VEC is determined, the $L_{OB}$ vector is solved as follows:

$$\begin{bmatrix} (LOB_2)_{XN} - (LOB_1)_{XN} \\ (LOB_2)_{YN} - (LOB_1)_{YN} \\ (LOB_2)_{ZN} - (LOB_1)_{ZN} \end{bmatrix} = \quad (61)$$

$$C_{N2}^B C_{RB}^B \begin{bmatrix} L_1 \\ L_2 \\ L_3 \end{bmatrix} - C_{N1}^B C_{RB}^B \left\{ \begin{bmatrix} L_1 \\ L_2 \\ L_3 \end{bmatrix} + \begin{matrix} VEC_1 * L_4 \\ VEC_2 * L_4 \\ VEC_3 * L_4 \end{matrix} \right\}$$

LOB is the change in position over the 1-second interval. This is to be differenced from the measured velocity for each axis. This difference will be the observation for the following Kalman Filter states:

$$\begin{bmatrix} \delta V_x \\ \delta V_y \\ \delta V_z \end{bmatrix} = \begin{bmatrix} V_X^N \\ V_Y^N \\ V_Z^N \end{bmatrix} - \begin{bmatrix} (LOB_2)_{XN} - (LOB_1)_{XN} \\ (LOB_2)_{YN} - (LOB_1)_{YN} \\ (LOB_2)_{ZN} - (LOB_1)_{ZN} \end{bmatrix} \quad (62)$$

The structures and methods disclosed herein illustrate the principles of the present invention. The invention may be embodied in other specific forms without departing from its spirit-or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for attitude alignment of a slave inertial measurement system that is connected to a rotationally mobile platform that is supported by a vehicle that is stationary relative to a reference navigation frame, comprising the steps of:
    mounting a master reference inertial measurement system on the rotationally mobile platform;
    determining a master reference system attitude by forming a master reference body to geodetic frame quaternion that indicates angular displacement between the master reference inertial measurement system and the reference navigation frame;
    determining a slave system attitude by forming a slave system body quaternion that indicates angular displacement between the slave system body frame and the slave system navigation reference frame;
    comparing the slave system attitude to the master reference system attitude to determine an attitude difference; and
    processing the attitude difference to obtain a correction to the slave system attitude.

2. The method of claim 1, further comprising an initialization step that includes the steps of:
    obtaining an initial value of the master reference system attitude;
    obtaining an initial value of the slave system attitude;
    sampling the master reference system attitude;
    sampling the slave system attitude; and
    processing the sampled master reference system attitude and the sampled slave system attitude to obtain an attitude correction; and
    applying the attitude correction to the slave system attitude to align the slave inertial measurement system.

3. The method of claim 1 wherein the step of determining the master reference system attitude further comprises the steps of:
    defining a master reference system body frame for the master reference inertial measurement system;
    defining a slave system body frame for the slave inertial measurement system; and
    determining angular displacements between the master reference system body frame and the slave system body frame.

4. The method of claim 1, further comprising a step of determining values of angular displacement between the slave inertial measurement system and the master reference inertial measurement system.

5. The method of claim 1 wherein the reference navigation frame is a geodetic coordinate frame.

6. The method of claim 1 wherein the step of comparing the slave system attitude to the master reference system attitude comprises the steps of:
    forming a boresight quaternion that indicates an initial value of angular displacement between the master reference body frame and the slave system body frame;
    forming a reference quaternion that combines the angular displacement of the boresight quaternion and that of the master reference body to reference navigation frame quaternion; and
    calculating a rotation vector that indicates rotation from the slave system body quaternion and the reference quaternion.

7. The method of claim 6, further comprising the steps of:
    collecting a selected number of sets of samples of the slave system body quaternion and the reference quaternion;
    calculating a rotation vector for each set of samples; and
    calculating average component values for the rotation vector for the selected number of samples.

8. The method of claim 7, further comprising the steps of:
    filtering the average component values with a Kalman filter to calculate a boresight update quaternion; and
    using the boresight update quaternion to calculate an updated boresight quaternion.

9. The method of claim 1, further comprising the steps of:
    determining a velocity vector for the slave inertial measurement system;
    determining a position change of the slave inertial measurement system in the slave system navigation reference frame; and
    calculating a velocity error using the slave system velocity vector and the position change of the slave inertial measurement system in the slave system navigation reference frame.

10. A method for correcting attitude errors of a unit that is to be launched from a rotationally mobile platform mounted on a stationary launch vehicle, the unit including a slave sensor fixed thereto to serve as a slave system body frame and the rotationally mobile platform including a master inertial measurement unit fixed thereto to serve as a master reference body frame, comprising the steps of:

initializing a boresight quaternion $q_{BOR}$ that has initial values of angular displacements between the master reference body frame and the slave system body frame;

initializing latitude, longitude, height and angular orientation of a selected bore in the launch vehicle from which the unit is to be launched;

initializing a quaternion $q^*_{L \rightarrow Geo}$ that indicates rotation from the master reference body frame to a geodetic frame;

combining the boresight quaternion $q_{BOR}$ with the quaternion $q^*_{L \rightarrow Geo}$ to provide a reference quaternion $q^*_B$ that indicates rotations between the selected bore and a slave system navigation frame;

providing a slave system body quaternion that indicates rotation between the slave system body frame and the slave system navigation frame;

calculating an update quaternion for adjusting the boresight quaternion thereby providing an updated reference quaternion; and combining the slave system body quaternion and the updated reference quaternion to obtain a corrected attitude by correcting errors in the latitude, longitude, height and angular orientation of selected bore that have occurred between initialization and launch.

11. The method of claim 10 wherein the step of combining the boresight quaternion with the quaternion $q^*_{L \rightarrow Geo}$ to provide a reference quaternion comprises the step of multiplying the quaternion $q^*_{L \rightarrow Geo}$ by the boresight quaternion $q_{BOR}$.

12. The method of claim 11 wherein the step of calculating an update quaternion comprises the steps of:

multiplying the reference quaternion by the slave system body quaternion to obtain approximate values for errors in an the angular displacement between master reference body frame and the slave system body frame;

calculating average values of the errors in the angular displacement for a selected number of samples;

processing the average values of the errors with a Kalman filter to produce the boresight update quaternion; and combining the boresight update quaternion and the boresight quaternion to provide an updated boresight quaternion.

13. The method of claim 10, further comprising steps of:

measuring a velocity of the slave sensor in the master reference body frame before the unit is launched;

measuring changes in position of the slave system body frame in the slave system navigation frame in selected time intervals; and calculating a velocity error using the measured velocity of the slave sensor and the changes in position of the slave system body frame.

14. The method of claim 13 wherein the calculated velocity error is used to update the attitude of the slave system body frame relative to the navigation reference frame to provide an improved accuracy of the slave system inertial measurement unit.

15. The method of claim 13 wherein the calculated velocity error is used in a Kalman filter to estimate error parameters of the slave inertial measurement unit and to apply corrections to improve its accuracy.

* * * * *